US 6,684,919 B2

United States Patent
Gaiser

(10) Patent No.: US 6,684,919 B2
(45) Date of Patent: Feb. 3, 2004

(54) FILLING LEVEL MEASURING DEVICE AND METHOD FOR THE NON-CONTACT DETERMINATION OF THE FILLING LEVEL OF A FILLING PRODUCT IN A RECEPTACLE

(75) Inventor: Martin Gaiser, Alpirsbach (DE)

(73) Assignee: Vega Grieshaber KG (DE)

(*) Notice: Subject to any disclaimer, the term of this patent is extended or adjusted under 35 U.S.C. 154(b) by 0 days.

(21) Appl. No.: 10/071,274

(22) Filed: Feb. 7, 2002

(65) Prior Publication Data
US 2002/0112774 A1 Aug. 22, 2002

Related U.S. Application Data
(60) Provisional application No. 60/276,533, filed on Feb. 15, 2001.

(30) Foreign Application Priority Data
Feb. 8, 2001 (DE) .......................... 101 05 662

(51) Int. Cl.⁷ ................................ B65B 1/04
(52) U.S. Cl. ............... 141/95; 141/198; 73/290 R; 73/290 V
(58) Field of Search .............. 141/95, 198, 192; 73/290 R, 290 V

(56) References Cited

U.S. PATENT DOCUMENTS

| | | | |
|---|---|---|---|
| 4,700,569 A | * 10/1987 | Michalski et al. ......... 73/290 V |
| 5,036,892 A | * 8/1991 | Stembridge et al. ........... 141/1 |
| 5,323,367 A | 6/1994 | Elle et al. |
| 5,614,911 A | 3/1997 | Otto et al. |
| 5,836,192 A | 11/1998 | Getman et al. |
| 5,948,979 A | * 9/1999 | Fitsch et al. .............. 73/290 V |
| 6,142,015 A | 11/2000 | Getman et al. |
| 6,295,874 B1 | * 10/2001 | Strutt et al. ................. 73/597 |

FOREIGN PATENT DOCUMENTS

| | | |
|---|---|---|
| DE | 42 18 303 | 3/1994 |
| DE | 43 32 071 | 3/1995 |
| DE | 44 07 369 | 9/1995 |
| DE | 195 38 678 | 4/1997 |
| DE | 198 173 78 | 10/1999 |
| EP | 0 459 336 | 12/1991 |
| EP | 0 871 019 | 10/1998 |

OTHER PUBLICATIONS

Peter Devine, "Radar Level Measurement; The User's Guide", VEGA Controls/P Devine, 2000, page 69.
M. Skolnik, "Introduction to Radar Systems", McGraw–Hill, Second Edition, 1980, pp. 382–384.

* cited by examiner

Primary Examiner—Steven O. Douglas
(74) Attorney, Agent, or Firm—Fay Kaplun & Marcin, LLP

(57) ABSTRACT

A method and apparatus for non-contact determination of overfilling of a receptacle filled with a filling product generates an envelope curve from echo signals reflected on a filling product surface. An amplitude of the echo signals is mathematically processed in a predetermined short range of the envelope curve, and is compared to a predetermined reference value (x). When the amplitude exceeds the predetermined reference value (x), a signal representative of overfilling of the receptacle is outputted. Further, described are an evaluation arrangement for realizing the method and a filling level measuring device equipped with such an evaluation arrangement.

31 Claims, 3 Drawing Sheets

FILLING LEVEL MEASURING DEVICE AND METHOD FOR THE NON-CONTACT DETERMINATION OF THE FILLING LEVEL OF A FILLING PRODUCT IN A RECEPTACLE

This application claim the benefit of Provisional Application No. 60/276,533, filed Feb. 15, 2001.

TECHNICAL FIELD

The present invention relates in general to a method for the non-contact determination of an overfilling of a receptacle filled with a filling product, wherein an envelope curve is generated from echo signals reflected on a filling product surface. Moreover, the present invention relates to an evaluation arrangement for realizing a method of this kind, and a filling level measuring device equipped with an evaluation arrangement of this kind.

Filling level measuring devices of the kind of interest here, work in particular according to the so-called pulse echo principle and scan a reflected echo signal.

Filling level measuring devices working on the pulse echo principle and scanning a reflected echo signal, generate from the scanned echo signal a series of data as to each echo in the echo image or the so-called envelope curve. Generating an envelope curve from echo signals is sufficiently known and, accordingly, further explanations as to this technology are not required here (cf., for example, German Patent DE 44 07 369 C2; M. Scholnik "Introduction to Radar Systems", $2^{nd}$ edition, 1980, McGraw-Hill; Peter Devine "Radar level measurement—the user's guide", VEGA Controls Ltd., 2000, ISBN 0-9538920-0-X).

BACKGROUND INFORMATION

Conventional filling level measuring devices are capable of detecting the filling level by measuring individual echoes in the envelope curve. Thus, the envelope curve is, for example, examined with low-pass filters, in particular a pull-down low-pass filter. In this way, the echoes are searched in ranges, which have been previously fixed by the intersection point of a detection threshold and the echo signal. Thus, an echo in the envelope curve is characterized by various features, such as, for example, amplitude, echo width at a certain amplitude below the peak, and the ascending gradient of the scanned echo signal before the peak. In this manner, the actual useful echo is ascertained, i.e. the echo, which has been reflected by the actual filling product surface, in particular separate from the other echoes and the dying-out transmission signal.

With this kind of signal processing, the problem arises in the short range of the sensor, that echoes interfere with the transmission signal which has not yet died out. With filling level sensors according to prior art accordingly, there can no longer be ascertained an unequivocal statement as to the filling level with an overfilling of a receptacle to be monitored. This can even lead to false measurements under certain circumstances. As soon as this condition arises, it can be recognized as an overfilling, what hitherto caused problems.

European Patent Application EP 0 871 019 A1 describes a method for the determination of an overfilling during the measurement of a filling level by means of an ultrasonic transducer. In this method, an overfilling is ascertained when the ultrasonic transducer is immersed in the filling product, here a liquid, or is covered by it. For determining the overfilling, the dying-out output signal of the ultrasonic transducer generated by the post-pulse oscillation of the ultrasonic transducer at the end of each ultrasonic transmission pulse, is evaluated. Thereby, it is taken advantage of the fact that the duration of the post-pulse oscillation is shorter due to the better coupling of the ultrasonic transducer to the liquid than to air, when the ultrasonic transducer is covered by the liquid. This method is technically realized in that the duration of the post-pulse oscillation of the ultrasonic transducer, until the drop to a predetermined amplitude value, is compared to a predefined time limit value. As an alternative, the amplitude of the post-pulse oscillation of the output signal of the ultrasonic transducer is compared in a predetermined moment after the end of the alternating voltage pulse, to a predefined threshold value, which is rated so that it is fallen below when the ultrasonic transducer is covered by the liquid. A further alternative consists in that the amplitude of the post-pulse oscillation of the output signal of the ultrasonic transducer is integrated in a determined time window after the end of the alternating voltage pulse, and the integration value is compared to a predefined threshold value, which is rated so that it is fallen below, when the ultrasonic transducer is covered by liquid.

In summary, it has to be stated that all of the methods disclosed in this publication have in common that a determined threshold value or time limit value has to be fallen below so as to identify an overfilling. All methods are in particular based on the technical effect that, when it is immersed in a liquid, an ultrasonic transducer dies out in a considerably faster manner than when it oscillates in air. Exactly this effect is now referred to for determining an overfilling. What happens to the emitted echoes, remains unobserved. Therewith, this kind of determining an overfilling can only be applied with ultrasonic transducers, and it is, moreover, only reliable, when an overfilling may be equaled to an coverage by or immersion in a liquid. Correspondingly, this kind of determining an overfilling, however, is not applicable to various filling level measuring devices, such as, for example, radar sensors, since filling product covering the radar antenna leads to a strong reflection of the signal, and therewith to an increase of the amplitude.

A similar arrangement may be seen from German Patent Application DE 195 38 678 A1. Finally, general reference is made to German Patent Application DE 198 17 378 A1 disclosing in general a filling level measuring device, which is less sensitive and easier to service as compared to known float-type switches, for which purpose the level of a material is detected via reflection signals of an electromagnetic radiation, and constitutes here in particular a so-called TDR filling level measuring device.

SUMMARY OF THE INVENTION

The present invention relates to a method for detecting an overfilling of a receptacle filled with a filling product. It is in particular supposed to create a possibility that a filling level measuring device working in particular on the pulse echo principle and scanning a reflected echo signal, is allowed to automatically detect an overfilling of a receptacle.

According to a first exemplary embodiment of the present invention, a method for the non-contact determination of an overfilling of a receptacle filled with a filling product is described where an envelope curve is generated from echo signals reflected on a filling product surface, the echo signal amplitude in a predetermined short range of the envelope curve is mathematically processed and compared to a predetermined reference value, and upon overstepping the predetermined reference value, a signal representative of the overfilling of the receptacle is outputted.

According to a further exemplary embodiment of the present invention, an evaluation arrangement is proposed for the non-contact determination of an overfilling of a receptacle filled with a filling product, by evaluation of echo signals of a filling level measuring device, which echoes are reflected on a filling product surface, which filling level measuring device includes a processing arrangement, which mathematically processes the echo signal amplitude in a predetermined short range of an envelope curve generated from echo signals reflected on a filling product surface, and compares same to a predetermined reference value, and outputs a signal representative of the overfilling of the receptacle upon overstepping the predetermined reference value.

According to yet another exemplary embodiment of the present invention, a filling level measuring device is proposed for the non-contact determination of the filling level of a filling product in a receptacle, comprising a transmitting and receiving arrangement for transmitting signals and for receiving echo signals reflected on a filling product surface, and an evaluation arrangement for the non-contact determination of an overfilling of a receptacle filled with a filling product by evaluation of echo signals reflected on the filling product surface. The evaluation arrangement includes a processing unit, which mathematically processes the echo signal amplitude in a predetermined short range of an envelope curve generated from echo signals reflected on the filling product surface, and compares same to a predetermined reference value, and upon overstepping a predetermined reference value, outputs a signal representative of the overfilling of the receptacle.

The present invention utilizes the large signal amplitudes arising in the short range of the echo signal for detecting an overfilling. Thus, from echo signals reflected on a filling product surface, an envelope curve is generated. The echo signal amplitude is mathematically processed in a predetermined short range of the envelope curve, and is compared to a predetermined reference value. Upon overstepping the predetermined reference value, a signal representative of an overfilling of the receptacle is outputted.

In particular, it is advantageous when the echo signal amplitude is integrated in the predetermined short range.

In general, it has to be noted that the "short range" of an envelope curve is in particular that range, which starts at the signal radiation arrangement, such as, for example, an ultrasonic transducer or a radar antenna, and extends up to 2 m or more from same.

If the transmission signal concerned is a radar pulse of a radar sensor, then it is advantageous to fix the predetermined short range in dependence on the transmission signal frequency. In particular, it is also advantageous to fix the predetermined short range in dependence on the kind of the filling product, i.e. depending on the fact whether the filling product is a liquid or a bulk material. With the evaluation of radar pulses of a radar-filling level measuring device, it is in particular advantageous to fix the predetermined short range in addition also in dependence on the kind of the antenna used for transmitting and receiving the radar pulses. Depending on whether a rod or a horn antenna is concerned, the short range of interest here, has to be fixed differently.

In case the signals to be evaluated are ultrasonic signals, it is advantageous to fix the predetermined short range in dependence on the configuration of the sound transducer for sending and receiving ultrasonic pulses, and in dependence on the transmission frequency.

It is in particular advantageous to fix the short range so that it extends from the beginning of the envelope curve up to that point of the envelope curve where the amplitude value is higher than the system noise by a predetermined safety distance. Thus, for example, the general system noise at a transmission frequency of 24 GHz, may be at approx. 20 dB. If a safety distance of 10 dB is, for example, selected, then the short range extends from the beginning of the envelope curve up to that point where the amplitude value is again 30 dB. In the aforementioned example, the short range to be examined would therewith be approx. 1 m.

The output of a signal representative of an overfilling of the receptacle basically makes only then sense when the safe range for measuring the filling level is left. Accordingly, it is in particular purposeful to compare the distance of a useful echo to a predetermined distance value, and to output a signal representative of an overfilling of the receptacle only for that case that the distance of the useful echo is smaller than the predetermined distance value.

On the other hand, it may in addition, or also as a single interrogation be purposeful to compare the signal-noise distance to a predetermined signal-noise distance, and to output a signal representative of an overfilling of the receptacle only for that case that the signal-noise distance is smaller than a predetermined signal-noise distance. Under the term signal-noise distance, also called measurement safety, the amplitude of the filling level is to be understood, which is above the system noise or the dying-out transmission signal.

It is in particular advantageous, when upon detection of an overfilling of the receptacle, a trouble message is outputted, which is then used by other systems. Alternatively, it is also possible to switch an alarm relay when the detection of an overfilling of the receptacle is ascertained by the aforementioned measures. A further alternative consists in maintaining an initial value preferably upon detection of an overfilling of the receptacle, for as long until the overfilling is no longer present.

An exemplary embodiment according to the present invention of an evaluation arrangement for the non-contact detection of an overfilling of a receptacle filled with a filling product by evaluation of echo signals of a filling level measuring device reflected on a filling product surface, comprises a processing unit, which automatically processes the signal echo amplitude mathematically in a predetermined short range of an envelope curve, and compares same to a predetermined reference value. Upon overstepping the predetermined reference value, the evaluation unit outputs a signal representative of the overfilling of the receptacle.

The evaluation unit may be configured to perform one or more features of the method according to the present invention.

An evaluation unit according to the present invention may be configured to be an autonomous unit spatially-physically separate from the actual filling level measuring device. Thus, it would, for example, be imaginable to integrate such an evaluation unit into a control panel. Depending on the given facts, however, it is also extremely advantageous to directly integrate such an evaluation arrangement into the filling level measuring device. In this case, the evaluation arrangement constitutes a part of the filling level measuring device. Over a conventional communication line, the overfilling signal is then outputted to other means such as, for example a control panel, or, if there is no overfilling condition given, a signal representative of the filling level is outputted.

It has still to be noted here that, of course, any programs, which can serve for realizing one of the above-described methods, fall within the scope of protection of the present invention, and have likewise to be protected as such.

BRIEF DESCRIPTION OF THE DRAWINGS

For the further explanation and the better understanding, several embodiments of the present invention are described in more detail in the following with reference to the attached drawings. Therein show.

DETAILED DESCRIPTION

Figure 1:
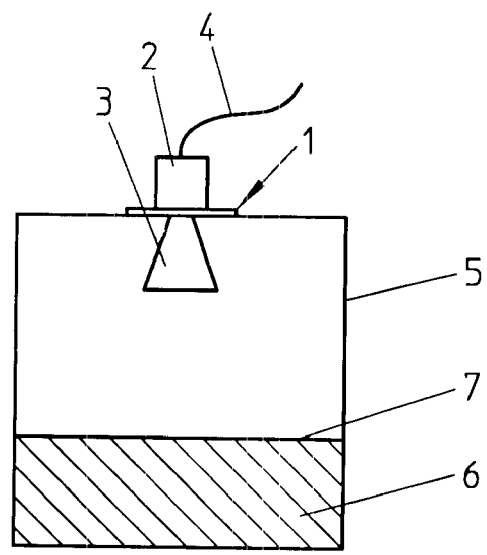
FIG. 1 shows an extremely schematic cross-sectional view of a receptacle filled with a filling product and of a filling level measuring device mounted in the top zone of the receptacle.

FIG. 1 shows a filling level measuring device 1 is mounted in the top zone of a receptacle 5. Within receptacle 5, a filling product 6, bulk material or liquid, is present forming a filling product surface 7.

The filling level measuring device 1 mounted in receptacle 5 comprises a housing 2 and a horn antenna 3. Via a cable 4, in particular a so-called 4–20 mA two-wire loop, the filling level measuring device is connected to a power supply unit and communication unit (not shown here).

Figure 2:
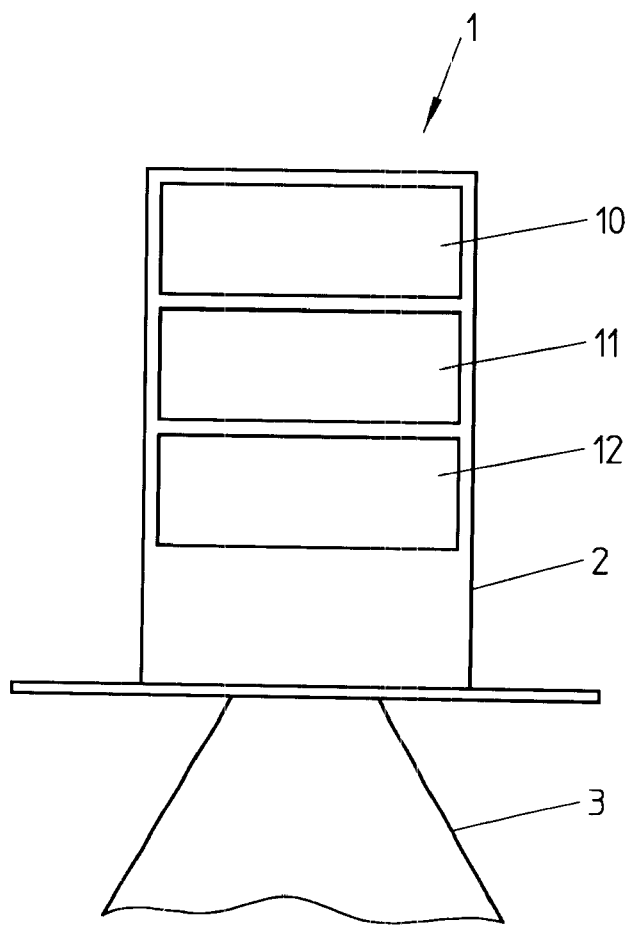
FIG. 2 shows a schematic representation of an exemplary embodiment of a filling level measuring device according to the present invention.

FIG. 2 illustrates the filling level measuring device 1 having an evaluation arrangement 10, a transmitting arrangement 11 and a receiving arrangement 12. With transmitting arrangement 11, short radar pulses in the microwave range are emitted via horn antenna 3 in the direction of the filling product surface 7. These signals are reflected on the filling product surface 7 and are received via the same antenna 3. In the receiving arrangement 12, these signals are further processed according to prior art, and are evaluated in the evaluation arrangement 10. For this purpose, an envelope curve is generated from the individual echo signals in a conventional manner. This envelope curve is then in turn closer examined using mathematical methods, in particular so as it is illustrated in the following flow charts.

Figure 3:
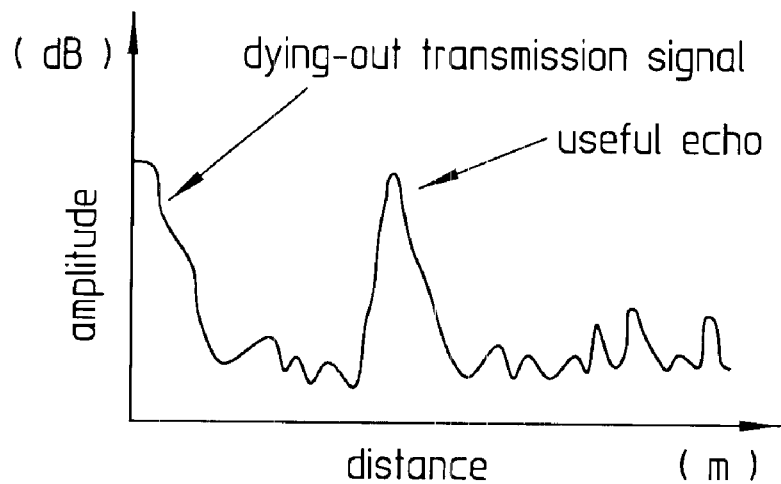
FIG. 3 shows an exemplary envelope curve of an echo signal, wherein the amplitude of received echoes over the distance from the filling level measuring device is outlined.

An example of an envelope curve is shown in FIG. 3, wherein the amplitude of an echo signal over the distance is outlined. As can be seen here, a dying-out transmission signal is contained in the envelope curve in the short range of the filling level measuring device. In the envelope curve, a useful echo may unequivocally be recognized, which is characteristic for the distance of the filling product from the filling level measuring device. In this exemplary envelope curve, hence, there is no overfilling given, but a useful echo is unequivocally detectable, from the data of which the filling level in the receptacle may be calculated.

Figure 4:
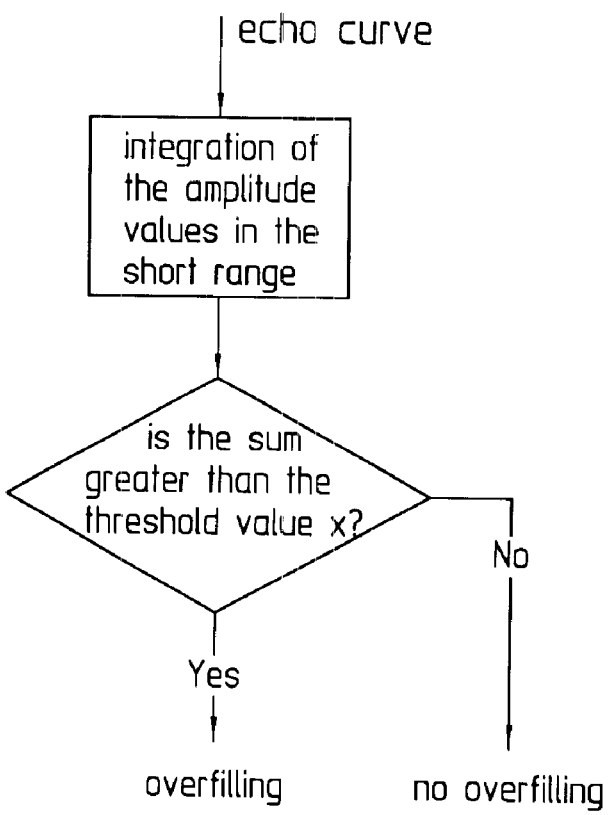
FIG. 4 shows a flow chart of a first exemplary embodiment of a method according to the present invention.

According to the flow chart of FIG. 4, the amplitude values are integrated from this envelope curve or echo curve in the short range. The sum of this integration is compared to a threshold value x. If this sum is greater than the threshold value x, a signal representative of the overfilling is outputted, otherwise, no corresponding signal is outputted.

Figure 5:
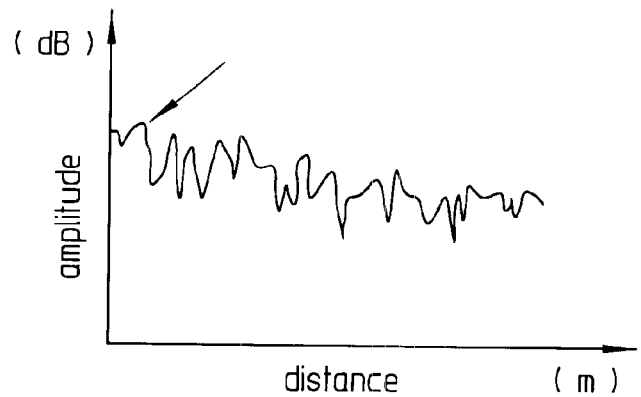
FIG. 5 shows an exemplary envelope curve for an overfilled receptacle.

An overfilling is, for example, given with the envelope curve of FIG. 5. Here, a useful echo may clearly no longer be ascertained. In the so-called short range, the out-dying transmission signal and the reflection from the filling product surface superpose. From this large signal amplitude, an overfilling may unambiguously be concluded, the integration sum here is greater than a threshold value x.

Figure 6:
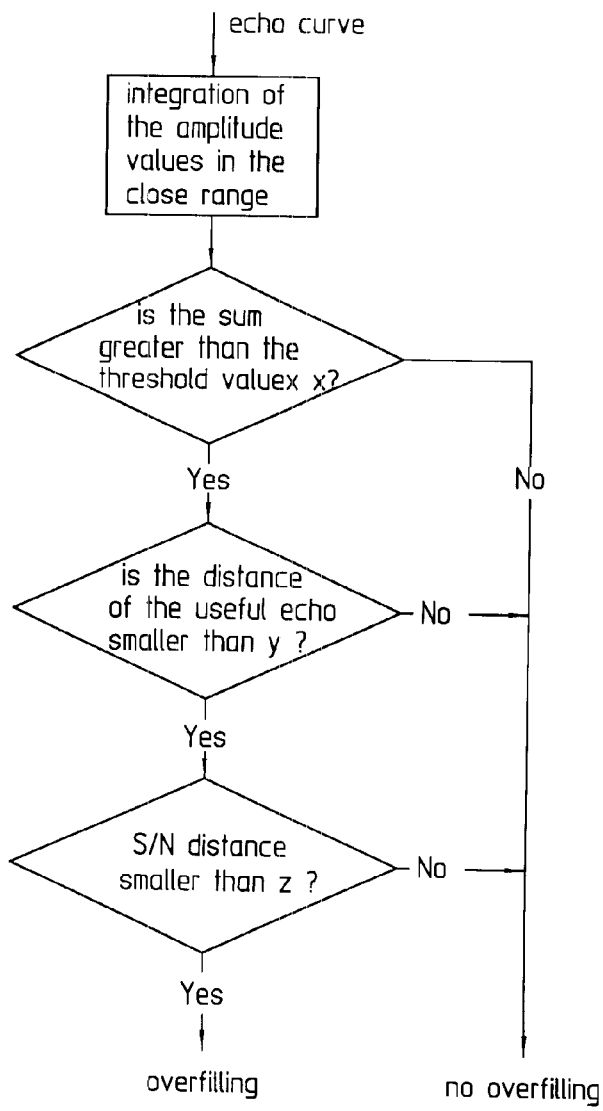
FIG. 6 shows a flow chart of another exemplary embodiment of a method according to the present invention.

A further exemplary embodiment of a method according to the present invention is shown in FIG. 6. The integration of the amplitude values in the short range is carried out again. Here, it is checked whether the sum is greater than the threshold value x. In the affirmative, it is further checked whether the distance of the useful echo is smaller than a further threshold value y. In the negative, no overfilling is outputted. If the distance is smaller than the threshold value y, it is again checked whether the so-called signal-noise distance of the useful echo is smaller than a further threshold value z. If this is the case, a signal representative of the overfilling is outputted, otherwise there is no overfilling message.

As described above, it is, of course, also possible to carry out these three successive checks in another combination or individually. Thus, for example, it may be only checked for the overfilling check whether the ratio from the sum of the amplitude values in the short range is smaller, due to the signal-noise distance, than a threshold value z, or only the distance of a useful echo smaller than the threshold value y is checked.

What is claimed is:

1. A method for a non-contact determination of an overfilling of a receptacle, the receptacle being filled with a filling product, the method comprising the steps of:
    generating an envelope curve utilizing echo signals reflected from a surface of the filling product;
    mathematically processing an amplitude of the echo signal in a predetermined short range of the envelope curve; and
    outputting, when the processed echo signal amplitude is greater than a predetermined reference value, a signal indicative of overfilling of the receptacle.

2. The method of claim 1, further comprising the step of:
    integrating the echo signal amplitude at least in the predetermined short range.

3. The method of claim 2, further comprising the step of:
    fixing the predetermined short range as a function of a type of the filling product.

4. The method of claim 1, further comprising the step of:
    fixing the predetermined short range as a function of a transmission signal frequency.

5. The method of claim 1, further comprising the steps of:
    fixing the predetermined short range as a function of a transmission signal frequency; and
    integrating the echo signal amplitude at least in the predetermined short range.

6. The method of claim 1, further comprising the step of:
    fixing the predetermined short range as a function of a transmission signal frequency and a type of the filling product.

7. The method of claim 1, further comprising the steps of:
    fixing the predetermined short range as a function of a transmission signal frequency and a type of the filling product; and integrating the echo signal amplitude at least in the predetermined short range.

8. The method of claim 1, further comprising the step of:
fixing the predetermined short range as a function of a type of antenna utilized for transmitting and receiving radar pulses.

9. The method of claim 1, further comprising the step of:
fixing the predetermined short range as a function of a transmission signal frequency and a type of an antenna utilized for transmitting and receiving radar pulses.

10. The method of claim 1, further comprising the step of:
fixing the predetermined short range as a function of a type of the filling product and a type of antenna utilized for transmitting and receiving radar pulses.

11. The method of claim 1, further comprising the step of:
fixing the predetermined short range as a function of a transmission signal frequency, a type of the filling product and a type of antenna utilized for transmitting and receiving radar pulses.

12. The method of claim 1, further comprising the step of:
fixing the predetermined short range as a function of a configuration of a sound transducer for transmitting and receiving ultrasonic pulses.

13. The method of claim 1, wherein the predetermined short range extends from a beginning of the envelope curve up to a point on the envelope curve at which an amplitude value exceeds a system noise value by at least a predetermined safety distance.

14. The method of claim 1, wherein the signal is output only when the distance of a useful echo is smaller than a predetermined distance value.

15. The method of claim 1, wherein the signal is output only when a signal-noise distance is smaller than a predetermined signal-noise distance value.

16. The method of claim 1, wherein the signal is output only when (a) the distance of a useful echo is smaller than a predetermined distance value and (b) a signal-noise distance is smaller a predetermine signal-noise distance value.

17. The method of claim 1, further comprising the step of:
outputting a trouble message when an overfilling of the receptacle is detected.

18. The method of claim 1, further comprising the step of:
activating a trouble alarm when an overfilling of the receptacle is detected.

19. The method of claim 1, further comprising the step of:
maintaining, until an overfilling is no longer present, an initial value of the signal generated when an overfilling of the receptacle is initially detected.

20. An evaluation arrangement for a non-contact determination of overfilling of a receptacle, the receptacle being filled with a filling product, comprising:
a filling level measuring device evaluating echo signals reflected from a surface of the filling product; and
a processing unit mathematically processing an amplitude of the echo signal in a predetermined short range of an envelope curve generated from the echo signals, the processing unit comparing the echo signal amplitude to a predetermined reference value and outputting a signal representative of overfilling of the receptacle when the echo signal amplitude is greater than the predetermined reference value.

21. The valuation arrangement of claim 20, wherein the processing unit integrates the echo signal amplitude in the predetermined short range.

22. The valuation arrangement of claim 20, wherein the predetermined short range is selected based on a frequency of the echo signals transmitted to the surface of the filling product.

23. The valuation arrangement of claim 20, wherein the predetermined short range is selected based on a characteristic of the filling product.

24. The valuation arrangement of claim 20, wherein the predetermined short range is selected based on a characteristic of an antenna used to transmit and receive radar pulses.

25. The valuation arrangement of claim 20, wherein the predetermined short range is selected based on a configuration of a sound transducer for transmitting and receiving ultrasonic pulses.

26. The evaluation arrangement of claim 20, further comprising:
a first comparison arrangement comparing a distance of a useful echo to a predetermined distance value, and for outputting, only when the distance of the useful echo is smaller than the predetermined distance value, a signal representative of overfilling of the receptacle.

27. The evaluation arrangement of claim 26, further comprising:
a second comparison arrangement comparing a signal-noise distance to a predetermined signal-noise distance value, and for outputting, only when the signal-noise distance is smaller than the predetermined signal-noise distance value, a signal representative of overfilling of the receptacle.

28. The evaluation arrangement of claim 20, further comprising:
an outputting arrangement outputting a trouble message upon reception of a signal representative of overfilling of the receptacle.

29. The evaluation arrangement of claim 20, further comprising:
an outputting arrangement switching a trouble alarm relay upon reception of a signal representative of overfilling of the receptacle.

30. The evaluation arrangement of claim 20, further comprising:
an outputting arrangement maintaining an initial value of a signal representative of the overfilling of the receptacle until a overfilling is no longer present.

31. A filling level measuring device for non-contact determination of a filling level of a filling product situated in a receptacle, comprising:
a transmitting and receiving arrangement transmitting and receiving signals, the arrangement receiving echo signal reflected from a surface of the filling product; and
an evaluation arrangement evaluating the echo signals and mathematically processing an amplitude of the echo signals in a redetermined short range of an envelope curve generated using the echo signals, the processing unit comparing the echo signal amplitude to a predetermined reference value and outputting a signal representative of overfilling of the receptacle when the echo signal amplitude is greater than the predetermined reference value.

* * * * *